(12) United States Patent
Pimlott (10) Patent No.: US 9,972,362 B2
(45) Date of Patent: May 15, 2018

(54) CONTROLLER FOR CONTROLLING THE SPEED OF A COOLING DEVICE VIA VARYING SPEED STEPS, APPARATUS AND METHODS

(75) Inventor: Roger Mitchell Pimlott, Portsmouth (GB)

(73) Assignee: Seagate Technology LLC, Cupertino, CA (US)

( * ) Notice: Subject to any disclaimer, the term of this patent is extended or adjusted under 35 U.S.C. 154(b) by 862 days.

(21) Appl. No.: 13/526,286

(22) Filed: Jun. 18, 2012

(65) Prior Publication Data

US 2013/0333871 A1    Dec. 19, 2013

(51) Int. Cl.
  *G11B 33/14*  (2006.01)
  *G05D 23/19*  (2006.01)
  *G06F 1/20*   (2006.01)

(52) U.S. Cl.
  CPC ....... *G11B 33/142* (2013.01); *G05D 23/1919* (2013.01); *G06F 1/206* (2013.01); *G11B 33/144* (2013.01); *G06F 2200/201* (2013.01); *Y02D 10/16* (2018.01)

(58) Field of Classification Search
  None
  See application file for complete search history.

(56) References Cited

U.S. PATENT DOCUMENTS

| | | | | |
|---|---|---|---|---|
| 3,711,688 A * | 1/1973 | Stout | ................... | D21G 9/0027 |
| | | | | 162/259 |
| 4,104,976 A * | 8/1978 | Landau, Jr. | .......... | G05B 19/102 |
| | | | | 112/275 |
| 4,733,541 A * | 3/1988 | Ismail | ................ | G05D 23/1906 |
| | | | | 236/49.3 |
| 5,213,077 A | 5/1993 | Nishizawa et al. | | |
| 5,325,288 A | 6/1994 | Satou | | |
| 5,926,386 A * | 7/1999 | Ott et al. | ........................ | 700/70 |
| 6,340,874 B1 * | 1/2002 | Vladimir | ............ | H05K 7/20209 |
| | | | | 318/461 |
| 7,275,380 B2 * | 10/2007 | Durant et al. | ................... | 62/178 |
| 7,292,019 B1 * | 11/2007 | Fernald | ................. | H02M 3/157 |
| | | | | 323/297 |
| 7,331,532 B2 * | 2/2008 | Currie et al. | ................ | 236/49.3 |
| 7,565,226 B1 | 7/2009 | Cooley et al. | | |

(Continued)

OTHER PUBLICATIONS

United Kingdom Search Report dated Oct. 31, 2013 in corresponding Great Britain Patent Application No. GB1308640.0.

*Primary Examiner* — Robert E Fennema
(74) *Attorney, Agent, or Firm* — Holzer Patel Drennan (57) ABSTRACT

There is disclosed a controller (120) for controlling the speed of a cooling device (118) in an electronic apparatus (100), an apparatus (100), a storage enclosure (102) and a method of configuring an apparatus (100). The controller (120) is constructed and arranged to determine a speed value for the cooling device (118) in accordance with a temperature input received from a temperature sensor (122) associated with the apparatus, the speed value being selected from a set of N speed values. The controller is arranged to control the speed of the cooling device in accordance with the selected speed value. The step between at least one pair of adjacent speed values in the set is different from the step between another pair of adjacent speed values in the set.

20 Claims, 7 Drawing Sheets

(56) References Cited

U.S. PATENT DOCUMENTS

| | | | |
|---|---|---|---|
| 8,416,571 B2* | 4/2013 | Mizumura | H05K 7/20836 361/679.48 |
| 2003/0063437 A1 | 4/2003 | Kurihara | |
| 2003/0163296 A1* | 8/2003 | Richards | G06F 17/5036 703/14 |
| 2005/0265159 A1* | 12/2005 | Kanemaru | G11B 20/10009 369/47.1 |
| 2006/0141145 A1* | 6/2006 | Davidson | B29C 41/12 427/203 |
| 2006/0202045 A1 | 9/2006 | Liu | |
| 2007/0156361 A1* | 7/2007 | Hardt | H05K 7/20836 702/99 |
| 2009/0086307 A1* | 4/2009 | Meisburger | G03F 7/70216 359/292 |
| 2009/0111065 A1* | 4/2009 | Tompkins | F23N 1/022 431/12 |
| 2009/0171512 A1* | 7/2009 | Duncan | F24F 5/0035 700/300 |
| 2009/0192634 A1 | 7/2009 | Fujinaka | |
| 2010/0292813 A1 | 11/2010 | Boiko et al. | |
| 2010/0312364 A1 | 12/2010 | Eryilmaz et al. | |
| 2011/0045952 A1 | 2/2011 | Bergeon et al. | |
| 2012/0083925 A1* | 4/2012 | Scott | F24F 11/0079 700/275 |
| 2012/0253490 A1* | 10/2012 | Su | G05D 23/19 700/94 |
| 2012/0253543 A1* | 10/2012 | Laughman | F25B 49/02 700/300 |

* cited by examiner

Fig. 1A  Fig. 1B

PRIOR ART

PRIOR ART
Fig. 2

PRIOR ART

CONTROLLER FOR CONTROLLING THE SPEED OF A COOLING DEVICE VIA VARYING SPEED STEPS, APPARATUS AND METHODS

The present invention relates to a controller for controlling the speed of a cooling device, an apparatus, a storage enclosure and a method of configuring an apparatus. In embodiments, the invention relates to methods and apparatus for controlling the temperature of components which are cooled with a cooling device employing variable speed coolant flow. For example, this may be done using the control of air provided by a variable speed fan or blower, or a liquid coolant provided by a variable speed pump.

Figure 1A:
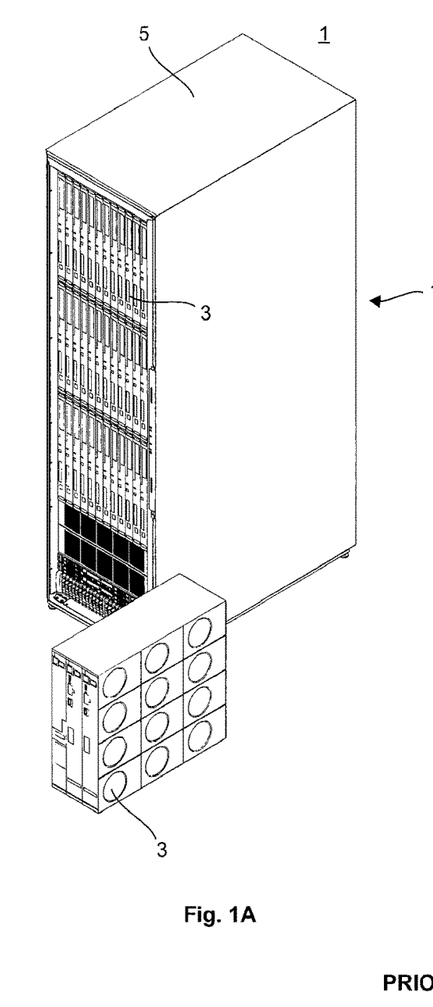
FIGS. 1A and 1B show examples of prior art storage systems.
Figure 1B:
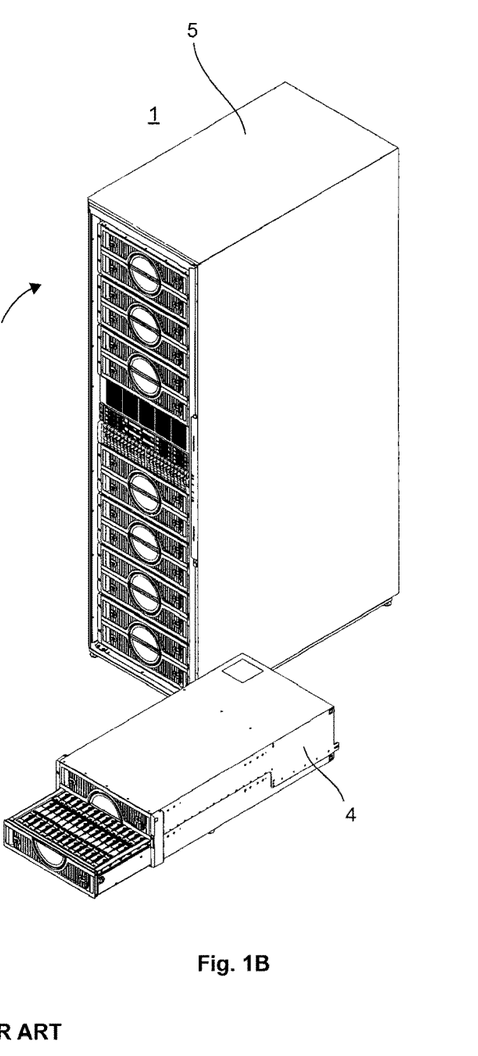

The primary field of use for the present method and apparatus is in the control of the temperature of disk drives and other components within storage systems such as storage enclosures and racks. FIGS. 1A and 1B show schematic representation of examples of storage systems.

Storage systems typically include plural storage media arranged somehow to enable data to be written to and read from individual media. The plural storage media are interconnected to storage interface modules (also known as Input Output (I/O) modules or storage controller modules) to create a storage system. The media may be disk drives, solid state drives, or any other form of data storage medium. The storage interface modules may be interface switches, interface controllers, RAID controllers, processing modules or similar. The storage interface modules may be located remotely to the storage media, for example in the rear of an enclosure where the storage media are in the front of the enclosure, or co-located with the storage media, for example Interface switches (SAS Expanders) co-located with the disk drives in the front of an enclosure. The storage systems typically also include power supply modules, enclosure management functions and cooling modules.

As the size and capacity of storage systems increases, there is an increasing need to provide efficient and effective means for temperature control and, in particular, cooling of the media such as disk drives within the storage system. Typically, a storage system includes storage modules which each contain plural disk drives and storage interface modules which provide internal and external connectivity between the storage media and the storage system external data fabric. It is known to pass cooling air through the storage system so as to remove heat produced in operation by the disk drives and thereby provide cooling to the storage system as a whole.

One example of prior art storage system would use a 'blade' type structure. The 'blade' is high but narrow, allowing multiple blades to be fitted across the width of a rack. A standard rack opening is approx. 48 cm (19 inches) into which typically 10 or 12 blades are fitted. Depth is determined by the number of drives being installed, but would typically be 3 drives deep and in to order of 500 mm. The structure of the blades limits the airflow across the installed devices and the density that can be achieved. Fully loaded blades can be heavy and their weight requires a structure fixed across the width of the rack to support them.

FIG. 1A shows a schematic representation of such a blade storage system. As can be seen the storage system 1, comprises plural blades 3 arranged within the housing of the storage system 1. Structure (not shown) across the width of the rack 5 is provided to support the weight of the blades 3.

In contrast, a storage enclosure system, as shown in FIG. 1B, uses a storage enclosure 4 fixed across the width of the rack. The storage enclosure 4 has one or more slidable drawers which may be withdrawn to allow access to the storage media inside. The height of the drawer is governed by the storage media (or storage interface modules) installed, such that a single storage medium, e.g. an individual disk drive, is accessible and serviceable from the top of the drawer when the drawer is withdrawn. The depth of the drawer is determined by the number of storage media installed, but is not limited in the same way as the blade. Since every storage media is individually serviceable the overall weight of the drawer does not become a serviceability limit. In contrast to the blade, the drawer is supported at its sides by the rack structure 5, relying on the strength of the drawer itself to provide support for the installed storage media.

In other types of storage enclosures, instead of having a drawer which can be withdrawn to allow access to the disk drives inside, the disk drives are inserted into bays in the enclosure through the front face of the enclosure. Normally this limits the enclosure to having disk drives only one layer deep.

Other layouts of storage enclosure are known and indeed commercially available.

However the storage system is arranged, its components, e.g. the disk drive units, the power supplies, the storage interface modules, other electronic components etc., generate heat in operation which needs to be carefully managed. Thus, an important consideration in the manufacture of a storage system is providing adequate cooling to keep the components from overheating. This is typically implemented by providing a cooling airflow through the system. Air movement device such as fans or blowers are positioned at key points within the enclosure and draw fresh air into the system via vents at the front, move the air through the system past the components to be cooled, and finally vent the air at the rear. Alternatively, liquid cooling systems are known where a variable speed pump circulates liquid coolant to transfer heat away from the components to be cooled. A cooling controller is provided which will control the speed of the fluid movement devices to adjust the degree of cooling. One or more temperature sensors are usually provided to measure the temperature in the enclosure or of a component. The cooling controller receives the temperature measurement and controls the cooling system in accordance to keep the enclosure from overheating. Many different cooling control schemes are known.

In many systems, maximum cooling is not needed all of the time. In these systems, it is preferable to operate the cooling system only to the degree cooling is needed, rather than operating the cooling system at full capacity at all times. For example, in a fan based system, operating the fan only when needed and at the speed needed increases fan lifetime, and reduces system noise and power consumption. It is generally desirable to minimise the noise of the system for environmental reasons.

Fluid movement devices such as fans give rise to vibration in a system with various intensities and frequencies depending on factors including their design, how they are mounted in the system, and their operating speed. The vibration that arises can potentially interfere with the operation of other components in the system. This is a particular problem in a disk drive storage enclosure where the performance of disk drives is sensitive to vibration due to the small tolerances with which the heads of the disk drive must be positioned relative to tracks on the disk surface. This problem manifests itself to the user as a reduction in disk throughput performance, or even disk drive failure. This is generally referred to as rotational vibration interference (RVI).

Due to these factors, it is usually required in manufacturing storage systems to test the RVI performance of the storage system with the fans operating over their full working range in order to ensure that there are no particular speeds that that give rise to a serious problem with RVI. Furthermore, this testing may have to be replicated for each disk drive family supported by the enclosure. Thus, using a large number of fan speeds has the drawback of needing a larger testing effort, which is expensive and time consuming.

A further consideration is that in many instances it is desirable to be able to swap modules, e.g. cooling modules, controller modules, power supply etc., between different storage enclosures. This means that the cooling system should preferably be able to adapt to use in different enclosures and different configurations of modules.

Figure 2:
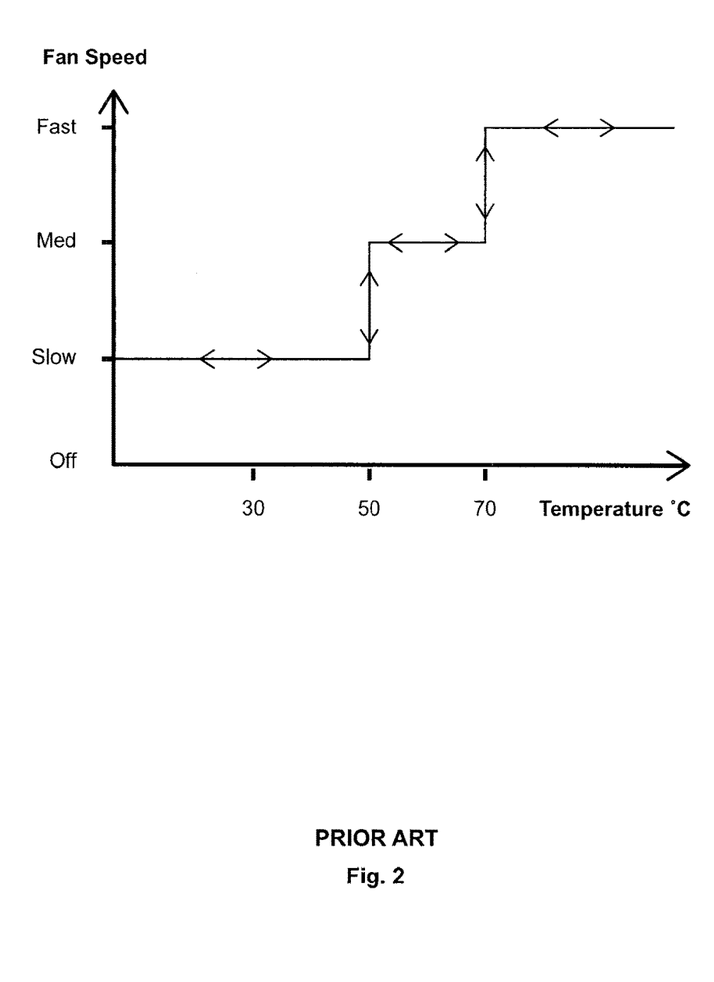
FIG. 2 shows a prior art cooling scheme based on using transition temperatures to change fan speeds.

Various schemes are known for controlling fan speed in such systems. In some systems, a small number of fixed fan speeds are used. FIG. 2 shows an example having three speeds comprising a slow, medium and fast speed setting. The fan controller is programmed with transition temperatures and changes the fan speed up or down when the transition temperatures are breached. The table for the example in FIG. 2 is given below.

TABLE 1

| Fan Speed | Transition Temperature (Increasing) | Transition Temperature (Decreasing) |
|---|---|---|
| Slow | 50 | — |
| Medium | 70 | 50 |
| Fast | — | 70 |

In order to provide greater stability around the transition temperatures, hysteresis may be added. Hysteresis greatly minimizes unwanted and too frequent fan speed fluctuations when the temperature is floating around transition points. An example is given in FIG. 3. As in the example of FIG. 2, when the temperature rises beyond 50 degrees C., the fan controller changes the fan speed from slow to medium, and when the temperature increases beyond 70 degrees C., the fan speed is changed from medium to fast. However, a different path is followed when the temperature is decreasing. In particular, when the temperature falls below 65 degrees C., the fan speed is changed from fast to medium, and when the temperature falls below 45 degrees C., the fan speed is changed from medium to slow. This gives rise to the following table.

TABLE 2

Figure 3:
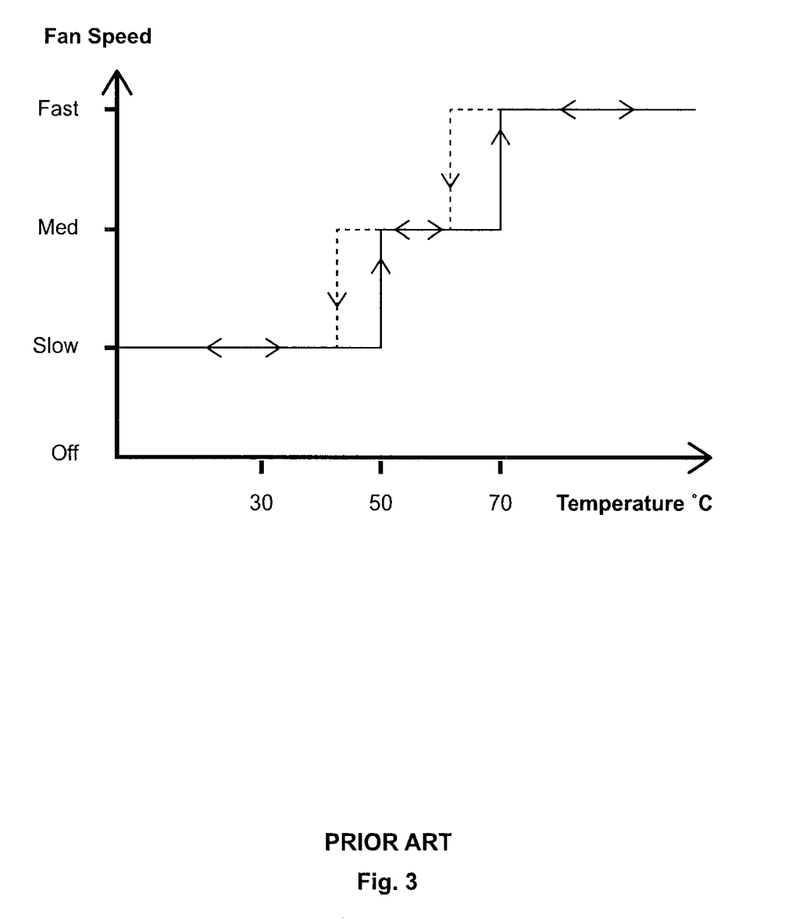
FIG. 3 shows another prior art cooling scheme which includes using hysteresis.

| Fan Speed | Transition Temperature (Increasing) | Transition Temperature (Decreasing) |
|---|---|---|
| Slow | 50 | — |
| Medium | 70 | 45 |
| Fast | — | 65 |

Using a relatively small number of transition temperatures, i.e. large steps in fan speed, has the advantage of simplifying the implementation and testing of the system. However, a drawback of this approach is that the fans are not run optimally for acoustics or power consumption, since the large steps in fan speed means that it is unlikely that the best fan speed will be used to achieve the necessary level of cooling at any time.

Another drawback is that the table approach does not scale easily. Different sets of transition temperatures may be required according to the enclosure type, the type of the modules and the number of disk drives in the enclosure, since these factors can affect how much cooling the enclosure requires. This gives rise to a large number of tables that must be created and stored so as to be accessible to the cooling controller, so that the cooling controller can use the appropriate table for the current configuration of the enclosure. The scale of the table rises by an order of magnitude where it is desired to create a single firmware to implement the cooling controller that can run on any controller and in any enclosure. Thus, the scale of the table quickly becomes unmanageable.

Another known method of fan control is to use a "proportional integral derivative" (PID) control, as are well known per se. PID controllers generally work well, particularly where there is an absence of knowledge of the underlying process. There are very many known examples of PID controllers. Some are disclosed in, for example, US-A-2011/045952, US-A-2010/292813, US-A-2010/312364, US-A-2009/192634, U.S. Pat. No. 5,325,288 and U.S. Pat. No. 5,213,077.

Figure 4:
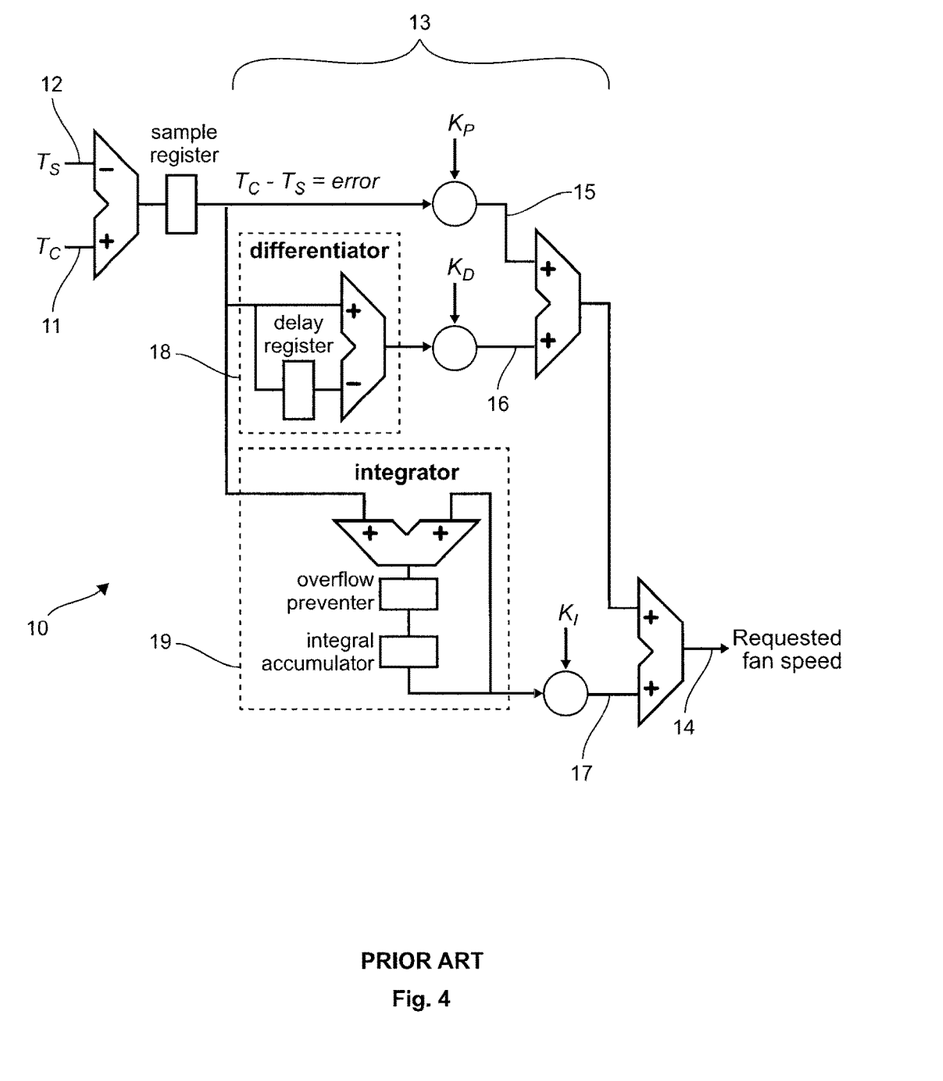
FIG. 4 shows a prior art cooling scheme using Proportional Integral Derivative control.

An example of a PID controller is shown by FIG. 4. The PID controller 10 is arranged to receive as inputs an actual measured component temperature ($T_C$) 11 and a target temperature ($T_S$) 12. Based on these inputs, the control block 13 generates an output signal 14 representing a requested fan speed. In the example shown, the controller 10 is for use in controlling the speed of a cooling fan.

In accordance with PID control theory and as is well known, the output signal 14 is determined by three signals 15, 16 and 17. The first signal 15 is the "proportional" term and is based on the simple difference or "error" ($T_S$-$T_C$) between the target temperature 12 and the actual measured component temperature 11. The second input signal 16 is based on the output of a differentiator 18 which is configured to receive the error signal and perform some further processing on it to give a measure of the rate of change in the error signal. The third input signal 17 is based on the output of an integrator 19 which is arranged to receive the error signal and further process it to give a measure of the cumulative error. Each of the input signals 15, 16 and 17 is produced by the respective upstream component multiplied by a factor KP, KD and KI. In a cooling control system, the output signal 14 may then be used to drive the speed of a fan (not shown).

Thus, it can be seen that such a conventional PID controller functions in dependence on a difference between the actual and desired temperatures of the component as represented by the two input signals 11 and 12 it receives. In dependence on these, an output signal 14 is generated driving a new fan speed. By relying on continual adjustment of the fan speed the component temperature is accordingly controlled and brought towards the desired target temperature. The PID controller has a theoretically limitless number of levels of fan control, although in practice the number of levels is limited by the resolution given by the number of bits used by the controller, e.g. using 8 bits in the controller would give 256 ($2^8$) possible levels of fan control. Whilst using a large number of fan speeds gives good control over the cooling system, this has the disadvantage that each fan speed must be tested for RVI, as described above. Thus, a drawback of a PID controller is that RVI testing is a time consuming and costly exercise since a large number of distinct fan levels must be tested and this must potentially be done for each family of disk drive to be used in the storage system.

U.S. Pat. No. 7,565,226 discloses an example of a scheme for controlling fan speeds to prevent vibrational resonance in the enclosure. The scheme proceeds by measuring the read/write data rates of a disk drive whilst scanning the fan speed through an operable range. The usable fan speed ranges are determined as those that do not affect the data rates.

While the discussion has focussed on cooling arrangements for storage devices, it will be appreciated that similar considerations potentially exist in cooling arrangements for any type of electronic apparatus where variable speed cooling devices are used to control the temperature of components in the apparatus and where it is desirable to be able to control some sympathetic side effect of the cooling system (e.g. vibration and acoustics) from having a debilitating effect on the system.

According to a first aspect of the present invention, there is provided a controller for controlling the speed of a cooling device in an electronic apparatus, wherein the controller is constructed and arranged to determine a speed value for the cooling device in accordance with a temperature input received from a temperature sensor associated with the apparatus, the speed value being selected from a set of N speed values, the controller being arranged to control the speed of the cooling device in accordance with the selected speed value, wherein the step between at least one pair of adjacent speed values in the set is different from the step between another pair of adjacent speed values in the set.

By having a different step between two different pairs of adjacent speed values, it is possible to tailor the speed values allowed for the cooling device to the cooling devices and/or electronic apparatus. "Adjacent values" used herein means that the speed values are next to each other when arranged in ascending/descending speed order. In other words, an asymmetric set of allowable speed values are used. This allows the codling device speeds to be tailored to the system to achieve for example improved acoustic and power performance. This is in contrast to prior art arrangements, where the step size between speeds is the same between each pair of adjacent speeds, which means that a large number of speeds must be used to achieve close control over the speeds, or a loss of control ensues if a small number of speeds with large steps between speeds is used over the speed range.

The cooling device can be any variable speed mechanical cooling device such as one or more fans, blowers, pumps, etc. or any combination thereof.

Preferably, N is at least 8, and more preferably 10 or more. This allows a more sophisticated control of the speeds. However, preferably, N is less than 64, and more preferably less than 32. This reduces the number of speeds that must be tested for interference with other components in the apparatus. In one embodiment, N is between 12 and 24. This gives a preferred balance between implementing a sophisticated cooling device control scheme, whilst keeping down the overall number of speeds of the cooling device that must be tested.

Preferably the speed values in the set are more closely spaced in a predetermined range of speeds than outside that range.

This allows closer control of the speed of the cooling device in a predetermined speed range. This advantageously allows acoustic noise or power consumption of the cooling device to be controlled in certain ranges, which may correspond to speeds where acoustic noise is found to be a particular problem, or the range of speeds at which the cooling devices are expected to mostly used given the thermal characteristics of the apparatus. For example, an acoustic limit may be imposed for a "normal" operating temperature in the apparatus. Using the controller, it can be defined that for less than X degrees C. (e.g. 25 degrees C.) the noise of the enclosure will be less than X decibels. At the same time, the spacing outside the range of interest can be less closely spaced, thereby reducing the number of speeds which must be tested for RVI.

In at least one embodiment for at least 4 adjacent speed values, the step between adjacent speed values decreases with each step. Alternatively or additionally, for at least 4 adjacent speed values, the step between adjacent speed values increases with each step. This allows a gradual increase/decrease in the speed values and thus the control over the speed of the cooling device.

In an embodiment, moving from the lowest speed value to the highest speed value, adjacent speed values progressively become more closely spaced with each step, reach a minimum difference, and then become less closely spaced with each step.

In an embodiment, the smallest difference between adjacent speed values is less than 25% of the largest difference between adjacent values. More preferably, the difference is less than 10% of the largest difference between adjacent values.

In an embodiment, the controller has a resolution of M bits, corresponding to a possible $2^M$ integer speeds, wherein the set of N speed values is a subset of allowable speeds values of the $2^M$ possible values. In other words N is less than $2^M$. Preferably N is less than 20% of $2^M$.

The speed range in the allowable values may be 0 to $2^M$, or at least 80% of this range. M may be 8 for common controllers, giving 256 possible speeds. The minimum step may be a 1, 2 or 4 integer unit in the $2^M$ possible speeds in preferred embodiments.

In an embodiment, the controller comprises a feedback controller arranged to determine the speed value in accordance with the difference between a target temperature and the temperature input.

The target temperature can be programmed into the controller or received via a communication path from a component in the apparatus, e.g. a disk drive or other component the temperature of which it is desired to control. In a preferred embodiment, the controller implements Proportional Integral Derivative control.

In an embodiment, the controller translates the temperature input into a speed value using a lookup table of temperature transition values.

In an embodiment, the controller is arranged to receive an input indicative of the power requirements of the electronic apparatus or part of the electronic apparatus, and the controller is arranged to apply an offset in accordance with said input to the theoretical value before translating the value to an allowed speed value in the set. This can be used to provide a boost to the cooling system due to knowledge of excessive power (i.e. heat generation) at a location.

In an embodiment, the controller is arranged to calculate a theoretical speed value for the cooling device based on the temperature input, which is not limited to the N allowed values in the set, and then translates the theoretical value to an allowed value in the set. This can be done for example by finding the nearest value, the nearest highest value or the nearest lowest value from the set.

In an embodiment, the controller applies hysteresis when calculating the speed value for the cooling device.

In an embodiment, for at least one transition between adjacent allowable speed values, the controller is arranged to move up to the next highest speed at $X*(1-1/n)$, where X is the transition size, and move down to the next lowest speed at $X*(1/n)$.

In an embodiment, the controller is arranged to apply hysteresis only where the transition is greater than a predetermined minimum.

According to a second aspect of the present invention, there is provided an electronic apparatus in combination with a controller according to any preceding claim.

According to a third aspect of the present invention, there is provided a storage system for providing access to storage devices, the enclosure including a controller according to any preceding claim, at least one air movement device controlled by the controller and a temperature sensor for providing the temperature input to the controller.

Preferably, the controller is provided on a removable module and the set of speed values is provided on an electronic memory provided by the system, the controller being arranged to read the set of speed values from the electronic memory.

According to a fourth aspect of the present invention, there is provided a method of configuring an electronic apparatus comprising a controller for controlling the speed of a cooling device in the electronic apparatus, wherein the controller is constructed and arranged to determine a speed value for the cooling device in accordance with a temperature input received from a temperature sensor associated with the apparatus, the speed value being selected from a set of N speed values, the controller being arranged to control the speed of the cooling device in accordance with the selected speed value, wherein the step between at least one pair of adjacent speed values in the set is different from the step between another pair of adjacent speed values in the set, the method comprising:

identifying a speed range of the cooling device where it is desired to control acoustic noise; and, determining a set of allowable speed values where the fan values within the speed range are more closely spaced than fan values outside the speed range such that the controller has finer control of the speed of the cooling device within the identified speed range.

Embodiments of the present invention will now be described by way of example with reference to the accompanying drawings, in which.

Figures 5A, 5B, 5C:
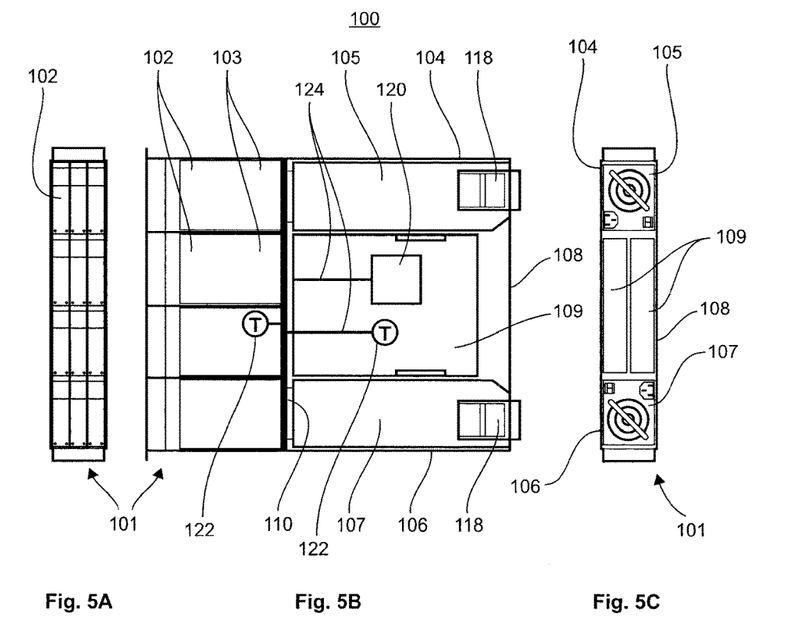
FIGS. 5A, 5B and 5C show schematically an example of a storage system according to an embodiment of the present invention, shown from the front, from above and from the rear respectively.

FIGS. 5A, 5B and 5C show schematically an example of a storage system 100 in accordance with an embodiment of the present invention. The storage system 100 comprises an enclosure 101, which is modular, having storage bays 102 at the front of the enclosure 101 for receiving data storage devices 103 such as 2.5 inch or 3.5 inch disk drives optionally mounted in carriers, and bays 104, 106, 108 at the rear of the enclosure 101 for receiving various modules, such as power supply units (PSUs) 105, cooling modules 107 and electronics modules 109. The electronics modules 109 typically include one or more storage controllers for organising and providing access to the storage devices. The electronics modules 109 may also provide enclosure management services, including a cooling controller, or other functionality.

The various modules 103, 105, 107, 109 connect to a midplane 110 within the enclosure 101 via connectors by which power, data and control signals are transmitted between components. The storage devices and modules are removable from the enclosure 101 for maintenance and/or replacement. Often modules 105, 107, 109 at the rear of the enclosure 101 are provided in duplicate or more so that a certain measure of redundancy can be provided in case of failure of a module. Modules 105, 107, 109 may be interchangeable between different models of enclosures.

Thus far described, the storage enclosure 101 is generally of a known type. Many other layouts and configurations of data storage enclosures 101 are possible and, indeed, available commercially. As will be apparent from the following description, the present invention is not limited to being used with any particular type of storage system 100.

The storage enclosure 101 contains one or more cooling devices 118 arranged to provide a variable speed flow of cooling fluid to cool the components in the enclosure 101. In the present example, the cooling devices are fans 118 which draw cooling air through the enclosure and past the components to be cooled. "Fans" are referred to in the rest of the description without loss of generality—however it will be appreciated that other fluid movement devices can be used to control variable speed flow of coolant in the system and that the following disclosure can equally be applied to other fluid movement devices.

In the present example, fans 118 are provided by a cooling module 107 and further fans 118 are provided by the power supply 105. The fans 118 may be provided elsewhere in the enclosure, such as in an electronics module 109.

A cooling controller 120 is provided for controlling the fans 118. This may be provided as a separate module in the enclosure 101, or integrated with any other module in the enclosure 101, or provided by the enclosure itself, e.g. on the midplane 110. In the present example, the controller 120 is provided by an electronics module 109 which may also provide other management functions to the enclosure or provide a storage controller. The controller 120 may be implemented by any electronic circuit, for example dedicated electronics, a suitably programmed microprocessor or field programmable gate array (FPGA), firmware, or any combination of these.

One or more temperature sensors 122 are positioned in the enclosure 101. The temperature sensors 122 may for example be located on the midplane 110, incorporated within a storage device 103 or its carrier, in a power supply module or electronics module, or separately provided anywhere within the enclosure 101. A communication path 124 connects the temperature sensors 122 with the controller 120 such that the controller 120 receives a signal representing the actual temperature of the enclosure or component measured by the sensors 122. The communication path 124 may be made via the midplane 110. The fan controller 120 also has a communication path 124 to the fans 118, which again may be made via the midplane 110. The controller 120 controls the speed of the fans 128 by an appropriate signal according to the type of fan.

For example, some types of fans 118 may be controllable by varying the magnitude of the drive voltage signal supplied to them. Alternatively, the fans may be driven by a PMW (Pulse-width modulation) signal. PWM switches the input voltage between fully on and fully off at a set frequency. The ratio between "on" time and "off" time is called the duty ratio. By controlling the duty ratio between 30% and 100%, the fan can be driven from 30% to 100% rotation speed for example. Feedback from the fan 118 of its speed can be passed to the controller 120 to allow more precise control of the fan speed. Thus, the controller 120 can control fan speed in accordance with the temperature sensed from the temperature sensors 122.

The controller 120 calculates a fan speed in accordance with the measured temperature of the component from the temperature sensor 122. This can be done in various ways.

Figure 6:
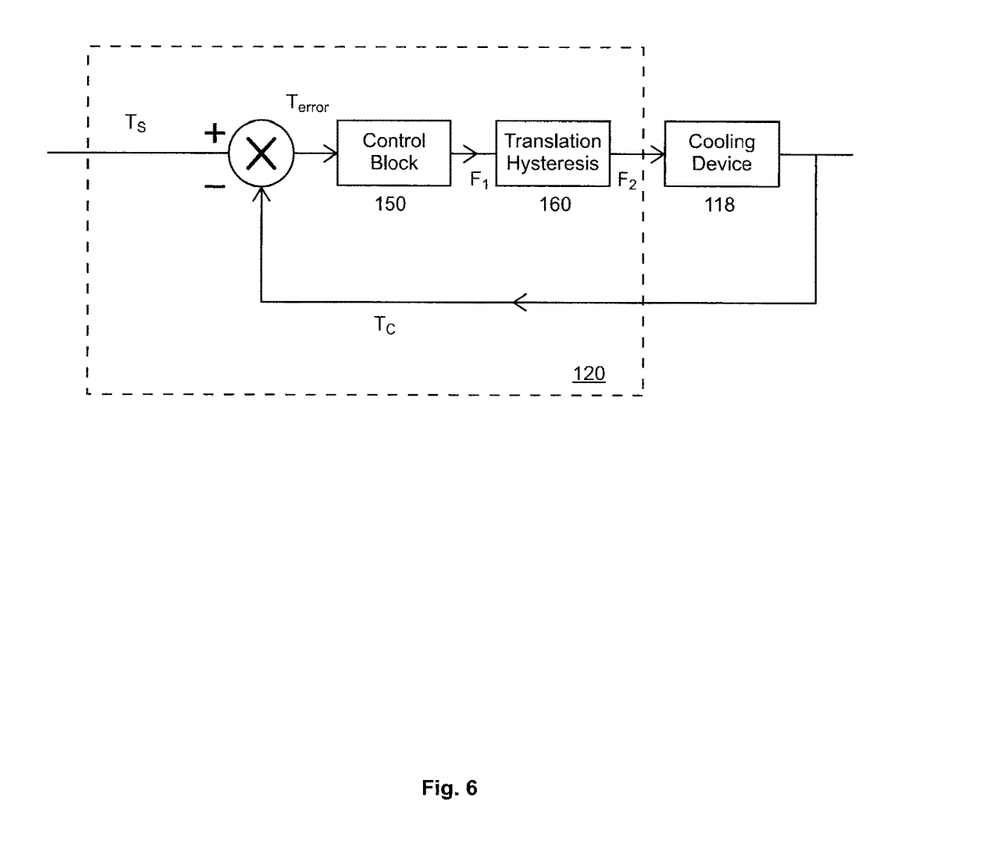
FIG. 6 shows a system diagram of an example of a controller according to an embodiment of the present invention; and, FIG. 7 shows an example of allowable fan speeds used by the controller of FIG. 6.
Figure 7:
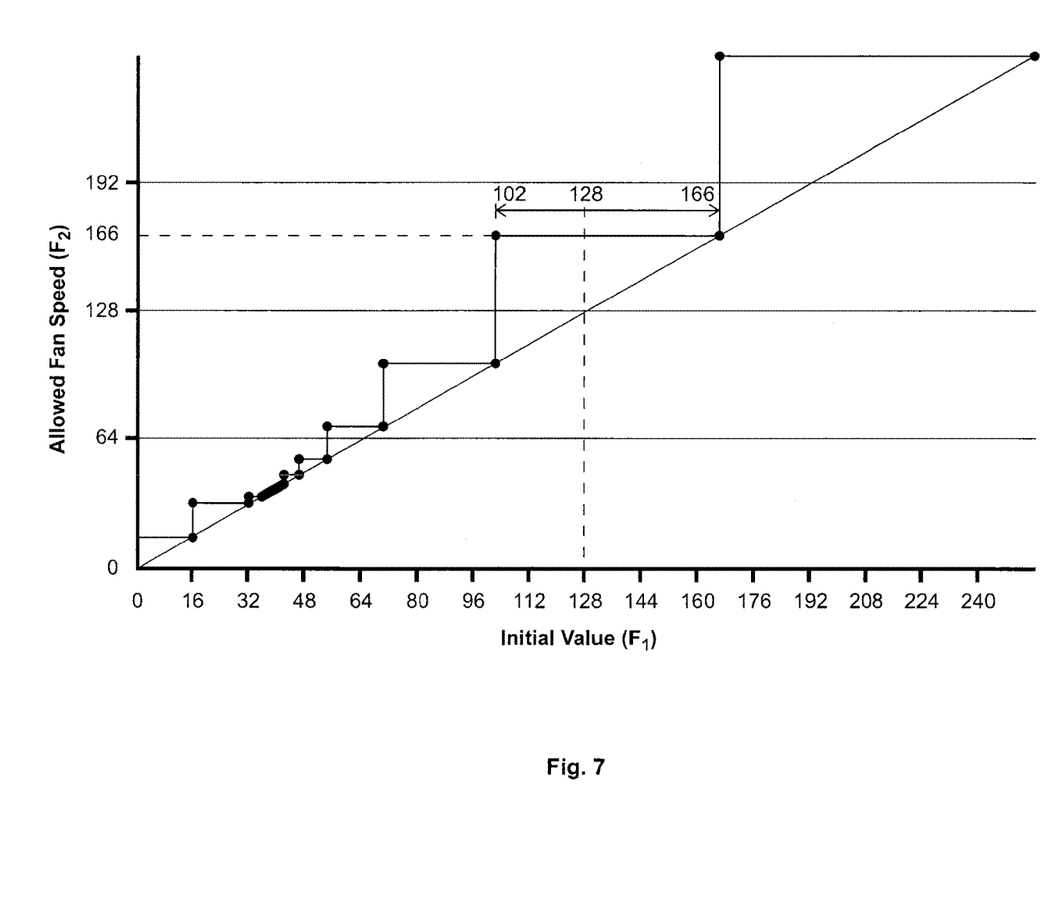

In the present example, as shown by FIG. 6, a feedback control loop is used to compare the actual temperature $T_C$ measured by the temperature sensor with the target temperature $T_S$. The error term $T_{ERROR}$ is used by the control block 150 to determine a "suggested" or theoretical fan speed $f_1$. In this example, the control block 150 uses Proportional Integral Derivative (PID) control which may be similar to the control block 13 shown in FIG. 4. The control block 150 uses 8 bits, giving 256 levels of fan control with 0 being the lowest speed and 255 the highest speed.

The controller 120 then translates this fan speed value $f_1$ to one of a subset of predetermined allowable fan speeds values $f_2$. The following set or table gives an example of a subset of allowable fan speeds $f_2$.

TABLE 3

| Fan Speed ($f_2$) |
| --- |
| 0 |
| 16 |
| 32 |
| 36 |
| 37 |
| 38 |
| 39 |
| 40 |
| 41 |
| 42 |
| 46 |
| 54 |
| 70 |
| 102 |
| 166 |
| 255 |

The translated fan speed $f_2$ is then used to control the speed of the fan or fans, e.g. using PWM or proportional voltage control as described above.

A simple translation strategy is to look up the next higher and lower values to the initial value $f_1$ and use the nearest available fan speed $f_2$. Alternatively the next higher or the next lower allowable fan speed can be used. Other schemes can be used, some further examples of which are described below. FIG. 5 shows a graph of the allowable fan speed values of Table 3 versus fan speed values, showing the values being translated to the next higher fan speed. As can be seen, fan speed values between 103 and 166 (e.g. 128 as illustrated in FIG. 5) would all be translated to the next higher allowable fan speed of 166, fan speed values of 167 to 255 would be translated as 255, etc., etc.

As can be seen, an asymmetric subset of allowable fan speed values is created out of the available values, i.e. the allowable fan speeds values in the set are not evenly spaced. This provides several advantages over prior art schemes.

In this example, allowable fan speeds are used over the full range of 0 to 255 (corresponding to the controller 120 using 8 bits). The fan speeds have a closer clustering around the 36 to 42 range giving finer control over these fan speeds, while spacing out the fan speeds at the periphery. This allows finer control around key fan speeds which have been found to relate to key acoustic output levels, which allows keeping down the fan speed and hence acoustic noise in these regions. At the same time, spacing out the fan speeds at the periphery allows fan speeds to be spread across the full range of fan speeds, whilst keeping down the overall number of different allowable fan speeds, which makes RVI testing quicker.

Another technique that can be implemented is that by creating a large step in fan speeds the acoustic noise can be controlled by keeping the fan speed at a lower fan speed for longer.

Thus using an asymmetric subset of allowable fan speed values from the possible values, allows the fan speeds to be tailored to the system 100 to achieve improved acoustic and power performance, whilst retaining a system that is relatively simple to test for RVI. Using a subset has the advantage that there are fewer fan speeds which must be tested for RVI, which means testing is quicker. At the same time, the full range of fan speeds can be used. Also, by using an asymmetric subset of values, the fan speeds can be selected according to the application. In particular, higher or full resolution of fan speed changes can be used over one or more key areas to give finer control to control the acoustic levels in fan speed ranges where acoustic noise is a particular problem, while spacing out the fan speeds at the periphery.

The target temperature $T_S$ may be stored within the component whose temperature it is desired to control, e.g. within the disk drive, or within the enclosure 101 itself, and read by the controller 120 over a communication path upon initialisation of the enclosure 101. Multiple target temperatures and/or sensors can be used for different points in the enclosure 101, with the largest difference between the actual temperature and the target temperature being used to drive the controller 120.

The set of allowable fan speed values could be implemented in a variety of ways using a sparse array or a bit field, depending on the number of speeds to be used.

The system is not limited to using a feedback control block/PID control to generate the fan speed. Other methods of generating the fan speed using the table can be used. For example, a threshold temperature based scheme could be used to find an allowable fan speed similar to the scheme described in relation to FIGS. 2 and 3.

The controller 120 may have an offset to move the fan speeds as a set based on its power usage. For example, in a storage enclosure 101, the electronics modules 109 might typically have a power rating of approximately 60 W for a relatively simple controller, or 100 W to 150 W for a controller which is based around a PC (Personal Computer) architecture, and 250 W or more for the highest power consuming devices. The electronics modules 109 may be interchangeable in the storage enclosure 101 to implement different organisations of the storage media, e.g. as a RAID array or an "Expanded Bunch Of Disks", etc. Furthermore, the higher power electronics modules 109 tend to have denser components on their circuit boards and the denser the circuit board the more likely it is that a hotspot may occur without a temperature sensor 122 being near it to drive the fan controller. It may therefore be advantageous for the cooling controller 120 to use a higher range of fan speeds, i.e. provide a "boost", when the enclosure 102 is populated with an electronics module 109 that consumes relatively more power.

In this case, the cooling controller, which may be implemented in the electronics module, is arranged to apply an offset to the fan speed values, such that higher values of fan speeds are used to provide more cooling for higher power modules. This allows the same table of fan speeds to be used. In other words, if the speed range is defined as M=8 so allowed values are 2^M, i.e. 0 . . . 255, then the normal calculation method may suggest that speed $f_1$=35 is applicable, but an offset of X (say 10 in this example) may be applied due to knowledge of excessive power (i.e. heat generation) at a location in the apparatus. So Speed 45 is desired. But the allowed fan speeds $f_2$ are (using the example of Table 3) 0, 16, 32, 36, 37, 38, 39, 40, 41, 42, 46, etc. In this case the closest allowed speed $f_2$ would be 46, so the boost would set the speed to 46.

The storage devices 103 in a storage enclosure 102 are another example where there may be limited coverage by temperature sensors 122 and where the heat output of the storage devices 103 may vary according to their type. This technique of applying an offset can be used to provide a boost to the fan speeds for certain types of storage devices 103, e.g. Solid State Devices, over traditional hard disk drives.

In an example, the cooling controller 120 is capable of building hysteresis in. This can be done by implementing two tables of allowable fan speed values, one for increasing temperatures and one for decreasing temperatures. Alternatively, one table of allowable fan speeds can be used, and the controller 120 can implement hysteresis, wherein the controller moves to the next allowed fan speed if:—

1) If the difference between fan speeds is relatively small, e.g. 1 or 2, then change the fan speeds when the threshold is breached.

2) If the difference between fan speeds is not relatively small, e.g. >2, then change fan speed up at (1−1/N), e.g. ⅔ for N=3, the difference between the thresholds and change fan speed down at 1/N, e.g. ⅓ for N=3, the difference between the thresholds.

In other words, if the difference in thresholds is relatively small, then hysteresis is not applied. If the difference is relatively large, then hysteresis is applied by changing the fan speed up and down at different points.

For example there are allowed fan speed settings of 24, 32 and 48 and the controller is currently at speed 32 and N=3. Then to drop the fan speed, the difference between the current speed 32 and the next lower speed 24 is 8, so the calculation gives 24+(8*⅓)=26 to the nearest integer value. Thus, the drop in fan speed to the allowable fan speed value 24 is not implemented by the controller until a suggested fan speed value $f_1$ of 26 is reached. To raise the fan speed, the difference between the current speed 32 and the next higher speed 48 is 16, so the calculation gives 32+(16*(1−⅓))=43 to the nearest integer value. Thus, the raise in the fan speed to the next allowable value 48 is not implemented by the controller until a suggested fan speed value $f_1$ of 43 is reached.

Storage enclosures 101 commonly have an EEPROM or similar memory device on their midplane 110 which stores various product data for the enclosure 101. Conveniently, the allowable fan speeds $f_2$ may be stored on this midplane EEPROM where present and read by the controller 120 from the EEPROM. Different customers could have different configuration settings allowing speeds to be limited as needed.

Embodiments of the present invention have been described with particular reference to the example illustrated. However, it will be appreciated that variations and modifications may be made to the examples described within the scope of the present invention.

The invention claimed is:

1. A controller for controlling the speed of a cooling device in an electronic apparatus,
    wherein the controller is constructed and arranged to determine a speed value for the cooling device in accordance with a measured temperature received from a temperature sensor associated with the apparatus and in accordance with a speed range of the cooling device where it is desired to control acoustic noise, the speed value being selected from a set of N speed values, the controller being arranged to control the speed of the cooling device in accordance with the selected speed value,
    wherein when moving from a low speed value greater than zero to a higher speed value, a first pair of adjacent speed values has a first step therebetween, a second pair of adjacent speed values has a minimum step therebetween, and a third pair of adjacent speed values has a third step therebetween, the minimum step being less than the first step and the third step, and
    wherein the speed values within the speed range are more closely spaced than speed values outside of the speed range.

2. A controller according to claim 1, wherein for at least 4 adjacent speed values, the step between adjacent speed values decreases with each step.

3. A controller according to claim 1, wherein for at least 4 adjacent speed values, the step between adjacent speed values increases with each step.

4. A controller according to claim 1, wherein the minimum step between the second pair of adjacent speed values is less than 25% of the largest of the first step and the third step.

5. A controller according to claim 1, wherein the controller has a resolution of M bits, corresponding to a possible 2^M integer speeds, wherein the set of N speed values is a subset of allowable speeds values of the 2^M possible values.

6. A controller according to claim 1, wherein the controller comprises a feedback controller arranged to determine the speed value in accordance with the difference between a target temperature and the measured temperature.

7. A controller according to claim 1, wherein the controller translates the measured temperature into a speed value using a lookup table of temperature transition values.

8. A controller according to claim 1, wherein the controller is arranged to calculate a theoretical speed value for the cooling device based on the measured temperature, which is not limited to the N allowed values in the set, and then translates the theoretical value to an allowed value in the set.

9. A controller according to claim 1, wherein the controller is arranged to receive an input indicative of the power requirements of the electronic apparatus or part of the electronic apparatus, and the controller is arranged to apply an offset in accordance with the input to the theoretical value before translating the value to an allowed speed value in the set.

10. A controller according to claim 9, wherein the controller is arranged to apply hysteresis when calculating the speed value for the cooling device.

11. A controller according to claim 10, wherein the controller is arranged to apply hysteresis only where the transition is greater than a predetermined minimum.

12. An electronic apparatus in combination with a controller according to claim 1.

13. A storage system for providing access to storage devices, the system comprising:
    at least one air movement device;
    a temperature sensor for providing a measured temperature; and
    a controller for the air movement device of the system, the controller constructed and arranged to determine a speed value for the air movement device in accordance with the measured temperature and in accordance with a speed range of the air movement device where it is desired to control acoustic noise, the speed value being selected from a set of speed values, the controller arranged to control the speed of the air movement device in accordance with the selected speed value,
    wherein when moving from a low speed value greater than zero to a higher speed value, a first pair of adjacent speed values has a first step therebetween, a second pair of adjacent speed values has a minimum step therebetween, and a third pair of adjacent speed values has a third step therebetween, the minimum step being less than the first step and the third step, and
    wherein the speed values within the speed range are more closely spaced than speed values outside of the speed range.

14. A storage system according to claim 13, wherein the controller is provided on a removable module and the set of speed values is provided on an electronic memory provided by the system, the controller being arranged to read the set of speed values from the electronic memory.

15. A method of configuring an electronic apparatus comprising a controller for controlling the speed of a cooling device in the electronic apparatus,
    wherein the controller is constructed and arranged to determine a speed value for the cooling device in accordance with a measured temperature received from a temperature sensor associated with the apparatus, the speed value being selected from a set of N speed values, the controller being arranged to control the speed of the cooling device in accordance with the selected speed value,
    wherein a step between at least one pair of adjacent speed values in the set is different from a step between another pair of adjacent speed values in the set,
    the method comprising:
    identifying a speed range of the cooling device where it is desired to control acoustic noise; and
    determining a set of allowable speed values where the speed values within the speed range are more closely spaced than speed values outside of the speed range such that the controller has finder control of the speed of the cooling device within the identified speed range.

16. A method according to claim 15, wherein for at least 4 adjacent speed values, the step between adjacent speed values decreases with each step.

17. A method according to claim 15, wherein for at least 4 adjacent speed values, the step between adjacent speed values increases with each step.

18. A method according to claim 15, wherein when moving from a low speed value to a high speed value, adjacent speed values progressively become more closely spaced with each step, reach a minimum difference, and then become less closely spaced with each step.

19. A method according to claim 15, wherein the controller comprises a feedback controller arranged to determine the speed value in accordance with the difference between a target temperature and the measured temperature.

20. A method according to claim 15, wherein the controller is arranged to apply hysteresis when determining the speed value for the cooling device.

* * * * *